(No Model.)
A. M. ROSS.
JOINTER PLOW.
No. 243,799. Patented July 5, 1881.
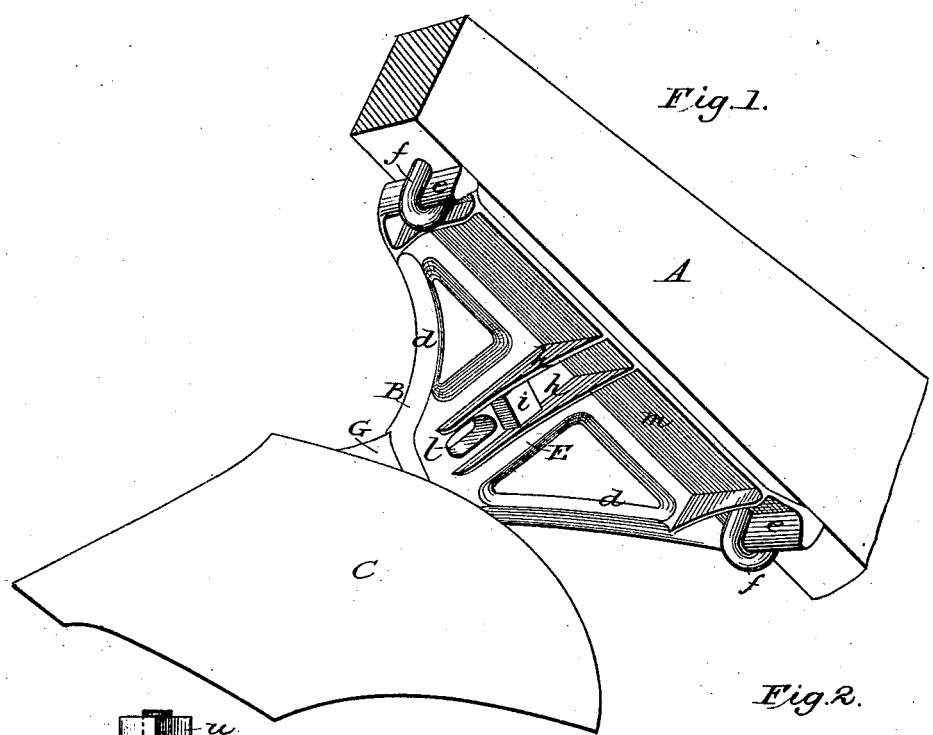
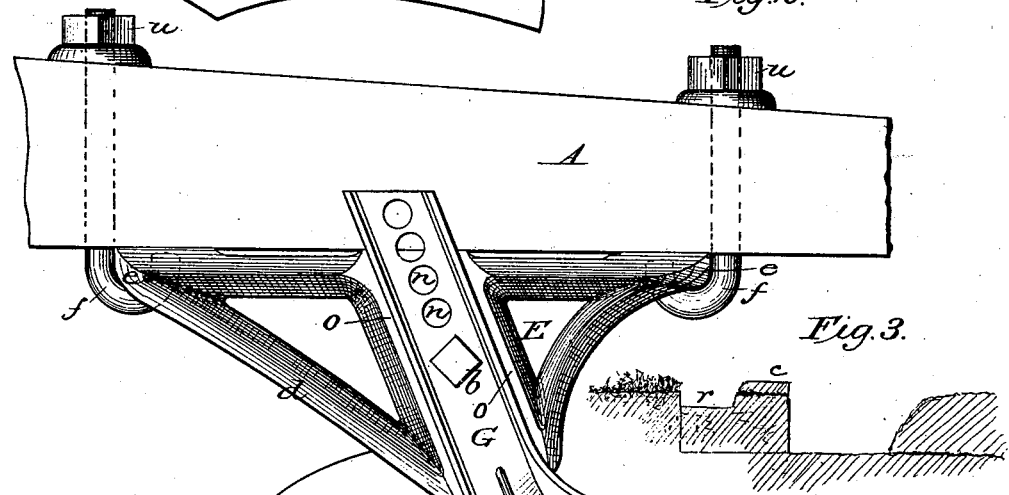
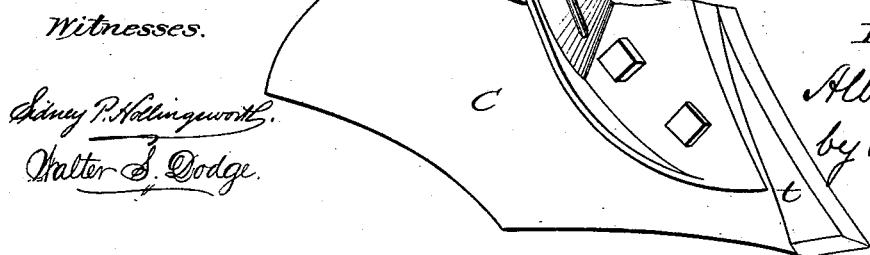
Witnesses.
Sidney P. Hollingsworth.
Walter S. Dodge.
Inventor.
Albert M. Ross,
by Dodge & Son,
Attys.

UNITED STATES PATENT OFFICE.

ALBERT M. ROSS, OF ILION, NEW YORK.

JOINTER-PLOW.

SPECIFICATION forming part of Letters Patent No. 243,799, dated July 5, 1881.

Application filed May 4, 1881. (No model.)

*To all whom it may concern:*

Be it known that I, A. M. ROSS, of Ilion, in the county of Herkimer and State of New York, have invented certain Improvements in Jointer-Plows, of which the following is a specification.

My invention relates to that class of plows which are known as "jointer-plows;" and the invention consists in a novel construction of the devices by which the supplemental or jointer mold-board is secured to the plow-beam and is adjusted, as hereinafter more fully set forth.

Figure 1 is a perspective view. Fig. 2 is a side elevation of so much of a plow as is necessary to show my improvements, while Fig. 3 illustrates its mode of operation.

As is now pretty well understood, a jointer-plow is one which has attached to the beam in front of the ordinary mold-board another and smaller mold-board, arranged to cut a slice about half the width of the full furrow, and very much shallower, and turn it over upon the uncut portion before the main furrow is turned, as indicated in Fig. 3, in which $c$ indicates the slice cut from the space $r$ and turned upside down upon the surface of the ground just before the furrow itself is turned by the main mold-board, the object being to completely bury the grass, weeds, &c., that may be upon the surface of the land, so they shall decay or rot, and prevent the grass, &c., from growing up through the joint between the furrows, and at the same time leave nothing but clean, fresh earth on the plowed surface, ready to be utilized for growing a crop, if desired. Various forms of these plows have heretofore been made, and various devices have been used for holding and adjusting the jointer mold-board.

My improved device consists, mainly, of the frame B, which is made of cast-iron, and consists of a plate, $m$, adapted to fit against the under side of the plow-beam A, against which it bears at its front and rear ends and at the center, as shown in Fig. 2. It has a central vertically-depending arm, E, with braces $d$, front and rear, all cast in one piece, with ribs $o$ $o$ arranged on one side to form a recess or groove, in which the standard G is held and adjusted, as shown in Fig. 2, while on its opposite side it is provided with the ribs $h$ $h$, which serve to brace and strengthen the parts E and $m$, as clearly shown in Fig. 1. The upper part or plate, $m$, is provided at each end with a transverse rib, $e$, on its under side, and these ribs $e$ fit in the bent or hooked ends of bolts $f$, said bolts extending up through the beam A, and are secured by washers and nuts $u$, as shown in Fig. 2. By this method of securing the frame or holder B to the beam A it will be seen that it, and consequently the mold-board C, can be adjusted laterally, either bodily or at either end alone, by simply loosening the nuts $u$, and without removing the bolts $f$, thereby saving much time and trouble.

The jointer mold-board C is made of one or two pieces of metal, of the form shown in Figs. 1 and 2, its front edge being made thicker, as shown at $t$, Fig. 2, where it is beveled and ground to a sharp edge, in order to readily cut the sod. It is made concave on its front face, and very nearly in the form of an ordinary mold-board, so as to readily and effectually turn the slice cut by it entirely over, as above described. It is securely bolted to the front angular face of a standard, G, which is so formed at its lower portion as to form a firm and solid bearing for the mold-board C, and at the same time give to the latter the required inclination both vertically and laterally. This standard G, which is also cast complete, is made of the proper length and of such a width as to fit in the recess or groove between the two ribs $o$ $o$ of the frame B, as shown in Fig. 2, and is provided with a series of holes, $n$, for vertical adjustment, there being one or more holes or slots, $l$, in the arm E, as shown in Fig. 2, the parts being secured together by means of a bolt, $i$, and a nut, $b$, as shown in Figs. 1 and 2.

It will be seen that by this construction I produce a light and strong device that can be readily attached to any ordinary plow, and that is capable of the nicest adjustments in each and all the directions required with the minimum of time and trouble. The use of the hooked bolts $f$ and the ribs $e$ not only facilitates the lateral adjustment, but it also enables either end to be adjusted independently of the other, or one end in one direction and the other end in the opposite direction at the same time, whereby the inclination of the mold-board C may be varied at will, to adapt it to all varieties and conditions of soil, and that, too, without weakening the plate $m$, as would be the case if it were provided with slots instead of the ribs e, and headed instead of hooked bolts were used, as would be necessary.

In practice the mold-board C is set so as to cut its slice on a line with the land side or inner edge of the main furrow and about half the width of the latter, as indicated in Fig. 3.

These devices are made both right and left hand, so they can be used with either a right or left hand plow, as may be desired.

Having thus described my invention, what I claim is—

1. The frame or holder B, consisting of the plate m, having a transverse rib, e, at each end, the central standard, E, with its front and rear braces, d, in combination with the hook-bolts f, substantially as shown and described.

2. In combination with the above-described frame or holder B, the vertically-adjustable curved standard G and mold-board C, all constructed and arranged to operate substantially as and for the purpose set forth.

ALBERT M. ROSS.

Witnesses:
LOUIS E. MOORE,
GEO. D. RICHARDSON.